March 29, 1960 — O. L. HENSLEY ET AL — 2,930,584
METHOD AND APPARATUS FOR INSERTING WIRES IN CONDUITS
Filed July 29, 1957 — 3 Sheets-Sheet 1
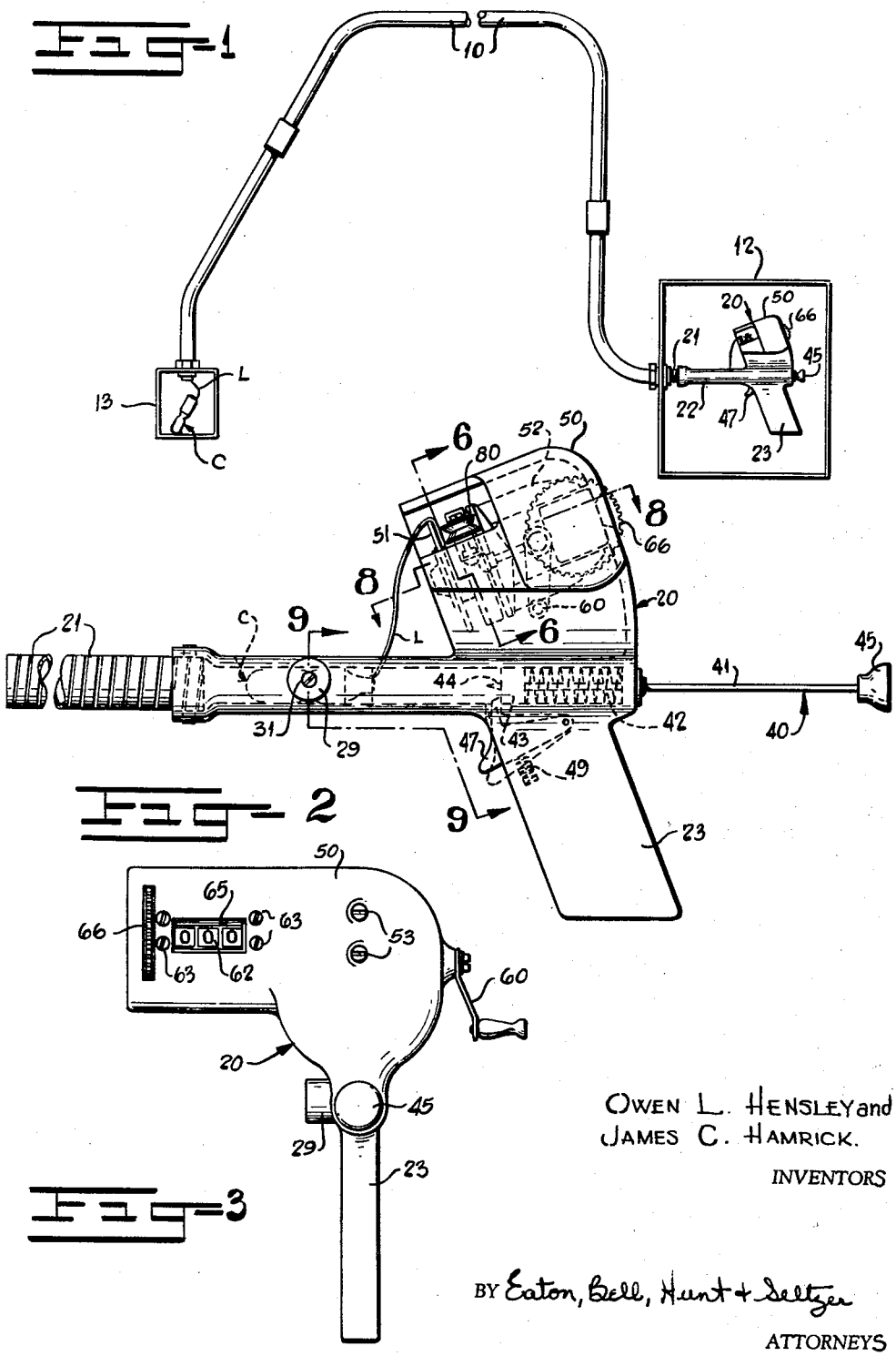
OWEN L. HENSLEY and
JAMES C. HAMRICK,
INVENTORS
BY Eaton, Bell, Hunt + Seltzer
ATTORNEYS

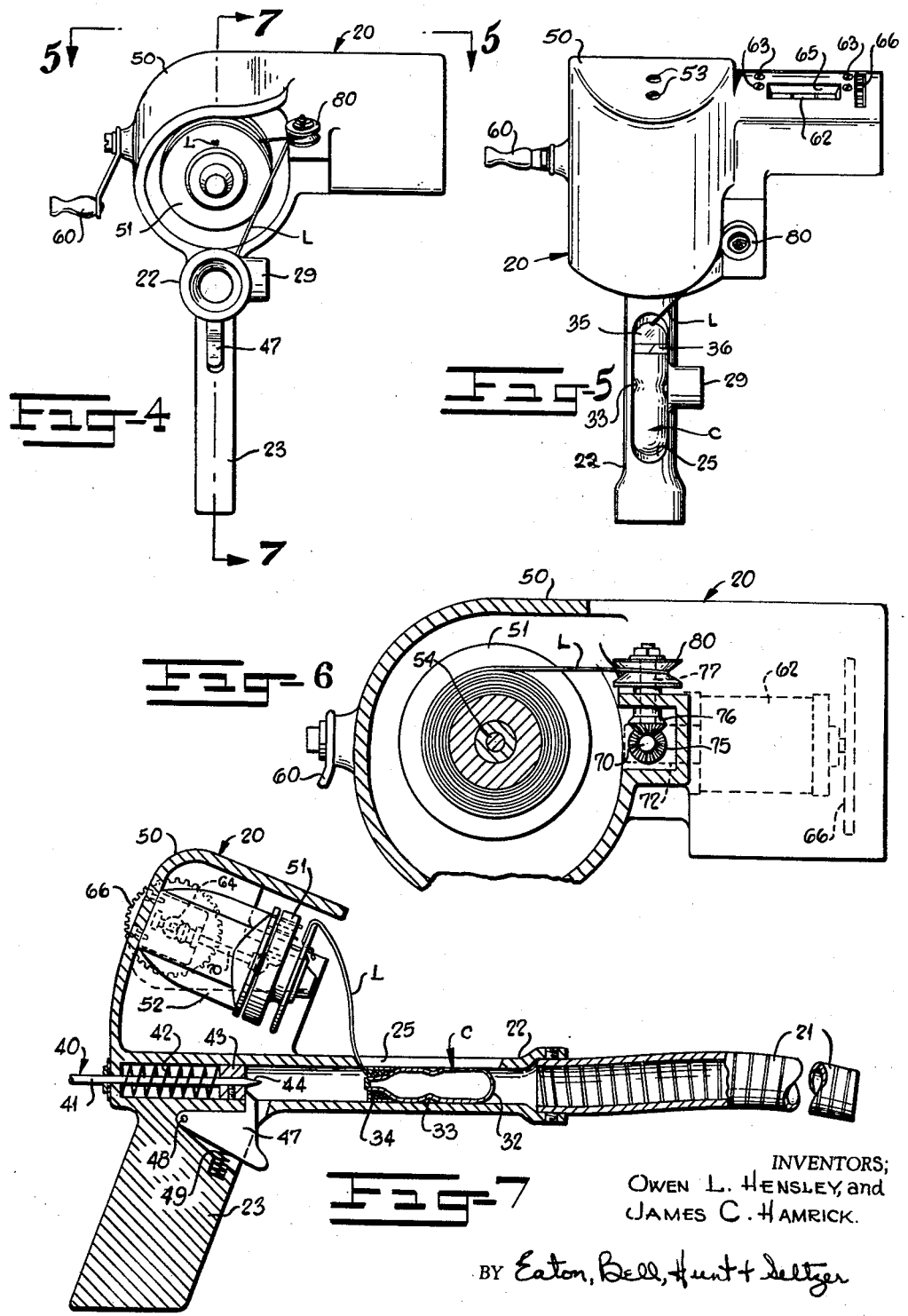

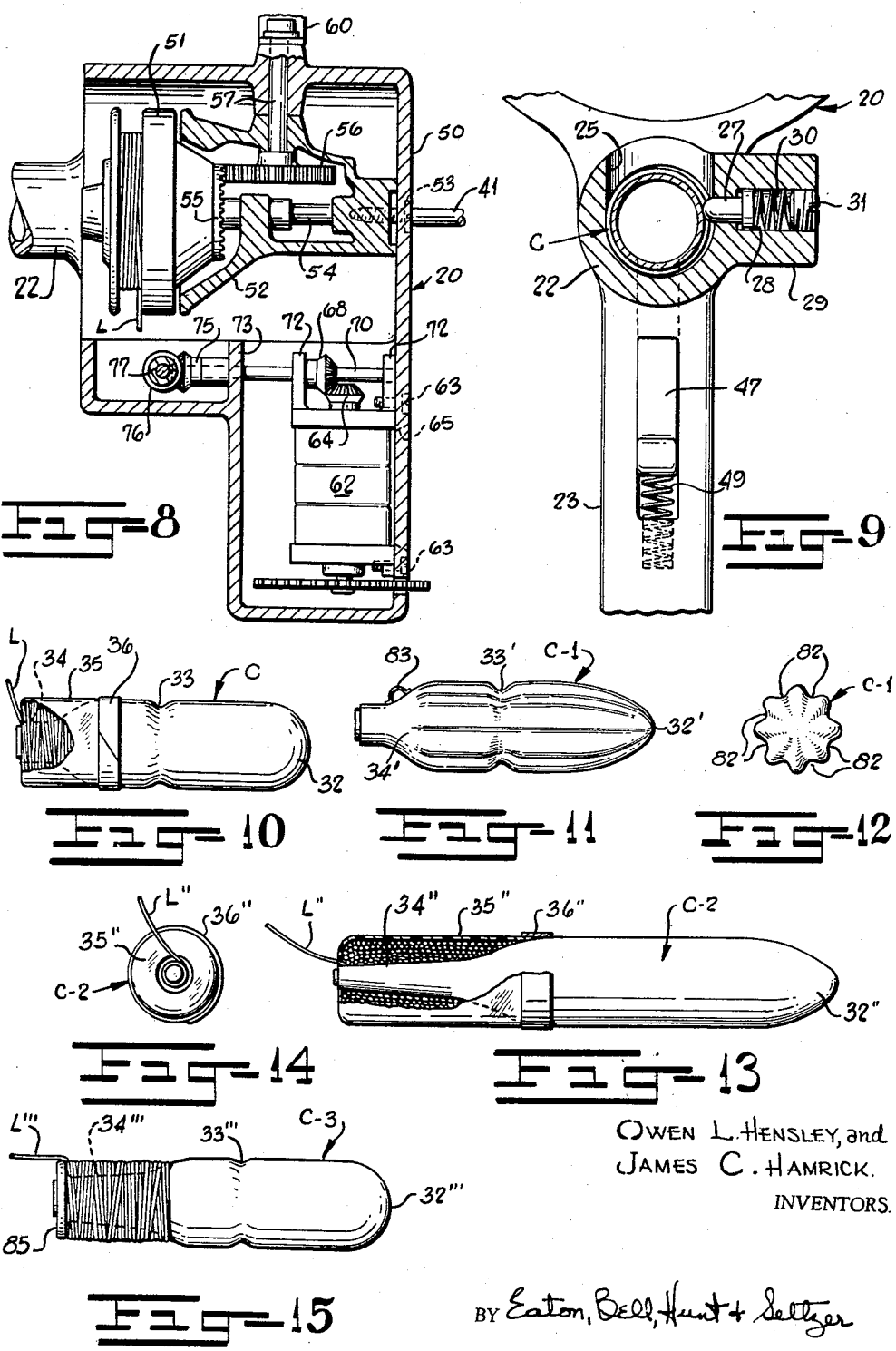

United States Patent Office 2,930,584
Patented Mar. 29, 1960

2,930,584
METHOD AND APPARATUS FOR INSERTING WIRES IN CONDUITS

Owen L. Hensley and James C. Hamrick, Charlotte, N.C., assignors to Jet Line Products, Inc., a corporation of North Carolina Application July 29, 1957, Serial No. 674,930

11 Claims. (Cl. 254—134.3)

This invention relates generally to a method and apparatus for inserting a wire or other pliable line in a conduit and, more particularly, to an improved method and apparatus for inserting electrical conductors in conduits.

Heretofore, it has been common practice to lay electrical conductors in conduits or pipes by means of "fish" or "snake" wires, usually made of relatively flat spring steel, and wherein a snake wire was inserted in one end of a conduit and pushed or otherwise forced therethrough to the other end of the conduit. The conductor was then attached to the wire and the wire was then pulled back through the conduit to pull the conductor into the conduit. This is a slow and tedious process and, in many instances, it has been impossible to force a snake wire completely through a conduit, due to the number and degree of bends in the conduit. Thus, a second snake wire had to be inserted from the other end of the conduit to catch the end of the first snake wire so the first snake wire could be pulled through the conduit. Snake wires need be wound on some type of reel and this makes them bulky and awkward to handle. Also, since snake wires are made of thin spring steel, they are relatively expensive.

Other attempts have been made to lay electrical conductors in conduits, without the use of snake wires, which have included attaching the end of a line to a ball or the like, placing the ball in one end of the conduit, and then forcing the ball through the conduit by means of compressed air or the like directed into the conduit behind the ball. This method, of course, required that a source of compressed air be readily available in order to force the ball and trailing line through the conduit and, in order to be effective, the conduit had to be relatively air tight or leak-proof so that sufficient pressure could be built up behind the ball to force it through the conduit.

It is a primary object of this invention to provide a method of inserting a line in a conduit which includes attaching the line to a self-propelled projectile, inserting the projectile into one end of the conduit, and activating the projectile so the projectile passes through the conduit under its own power whereby the line will be laid inside of the conduit.

It is another object of this invention to provide an activating apparatus for the self-propelled projectile which positions the projectile adjacent one end of the conduit and guide the projectile into the conduit and which activates the projectile so that it will be propelled through the conduit.

It is another object of this invention to provide an activating apparatus, for use in activating the self-propelled projectile, which is provided with reel means associated therewith to return the line left in the conduit by the projectile while pulling a second stronger line into the conduit, and to also provide line measuring means to indicate the length of the first line as it is returned, so that the correct length of the electrical conductor may be attached to the second line and pulled into the conduit by the second line as it is removed from the conduit.

It is a more specific object of this invention to provide a method and apparatus for inserting electrical conductors in conduits which includes the use of a relatively light line attached to a self-propelled projectile, such as a sealed cartridge containing compressed gas, and wherein the cartridge is initially positioned in an activating or firing apparatus adapted to guide the cartridge into one end of the conduit. The activating apparatus is provided with reel means to return the line left in the conduit to the activating apparatus, the activating apparatus also having automatic measuring means for indicating the length of the line originally left in the conduit as the line is returned.

Some of the objects of the invention having been stated, other objects will appear as the description proceeds when taken in connection with the accompanying drawings, in which—

Figure 1 is a somewhat schematic illustration showing a line inserted through a conduit and showing the cartridge after it has traversed the inside of the conduit with the activating apparatus in position at the opposite end of the conduit;

Figure 2 is an enlarged side elevation of the cartridge activator shown in Figure 1;

Figure 3 is a rear end view of the cartridge activator looking at the right-hand side of Figure 2;

Figure 4 is a front end view of the cartridge activator looking at the left-hand end of Figure 2;

Figure 5 is a plan view looking down on the top of the cartridge activator shown in Figure 4;

Figure 6 is an enlarged fragmentary substantially vertical sectional view taken substantially along the line 6—6 in Figure 2;

Figure 7 is a longitudinal vertical sectional view taken substantially along the line 7—7 in Figure 4;

Figure 8 is an enlarged fragmentary substantially horizontal sectional view taken substantially along the line 8—8 in Figure 2;

Figure 9 is an enlarged fragmentary sectional view taken substantially along the line 9—9 in Figure 2;

Figure 10 is an enlarged side elevation of the projectile shown in Figure 1 with parts broken away for clarity;

Figure 11 is a side elevation of a first modified form of projectile;

Figure 12 is a front end view of the projectile shown in Figure 11;

Figure 13 is a side elevation of a second modified form of projectile with parts broken away for clarity;

Figure 14 is a rear end view of the projectile shown in Figure 13;

Figure 15 is a side elevation of a third modified form of projectile.

Referring to Figure 1, there is shown a schematic illustration of a typical hollow conduit 10 installed in a building or the like, not shown, and opposite ends of which have respective junction boxes 12 and 13 connected thereto. It might be stated, that most electrical building codes limit the length of electrical conduits in buildings to a single run of not over 100 feet between junction boxes and the total number of bends or turns not to exceed four ninety degree bends with each bend having a radius of at least six times the diameter of the conduit. Although the present invention is primarily concerned with inserting electrical conducting wire in round metal conduit, of the type shown, this invention may be employed to insert other types of wire, string, line and the like in square conduits formed of materials other than metal, such as plastic, clay, cement and the like.

In the present invention, a self-propelled projectile or cartridge C is passed through the conduit 10 after a line L has been attached to the cartridge C. The cartridge C is activated to pass through the conduit 10 by an activator or firing apparatus broadly indicated at 20. The activator 20 includes a cartridge guiding means in the form of a flexible hose 21, one end of which is suitably connected to the free end of a barrel 22 which has a handle 23 integral with the opposite end thereof. The barrel 22 is provided with a slot 25 in the upper medial portion thereof to receive the cartridge C (Figures 5, 7 and 9).

A cartridge holding device is provided in the barrel 22 to engage the cartridge C and includes a spring pressed detent 27 mounted for sliding movement in the reduced portion of a bore 28 formed in an outwardly projecting boss 29 formed on one side of the barrel 22 of the activator 20. The detent 27 is normally urged inwardly into engagement with the cartridge C by a compression spring 30, one end of which engages the outer end of the detent 27 and the other end of which engages an adjustment screw 31 threadably mounted in the boss 29.

The cartridge C is provided with a rounded smooth nose or front end 32 (Figures 7 and 10), an annular centrally located depression 33 and an elongated relatively thin rear or tail portion 34. The line L may be wound around the elongated tail portion 34 of the cartridge C and a cap or cover member 35 placed therearound and secured thereto as by a strip of adhesive tape 36.

The activator 20 has cartridge piercing means broadly indicated at 40 mounted in the rear end of the barrel 22 and including a pin 41 slidably mounted therein which is normally urged inwardly towards the free end of the barrel 22 by a compression spring 42. One end of the spring 42 engages the closed rear end of the barrel 22 and the other end engages a collar 43 fixed adjacent the inner end of the pin 41. The inner end of the pin 41 is pointed as at 44 and the outer end of the pin 41 has a knob 45 (Figures 2 and 3) fixed thereon which may be used to move the pin 41 and the collar 43 rearwardly to the position shown in Figures 2 and 7 and compress the spring 42.

The pin 40 is held in its rearmost position (Figure 7) by a trigger 47 oscillatably mounted as at 48 in the handle 23 of the activator 20 and the trigger is normally moved into engaging position against the collar 43 by a compression spring 49. One end of the compression spring 49 is mounted in the handle 23 and the other end thereof bears against the lower portion of the trigger 47.

The rear upper portion of the activator 20 is provided with an integral housing 50 to support and enclose line retrieving means in the form of a reel 51. The reel 51 is fixed on a shaft 54 which is rotatably mounted in a gear housing 52. The gear housing 52 is fixed at its rear end to the housing 50 as by screws 53 (Figures 3, 7 and 8). The inner side or end of the reel 51 is provided with a ring gear 55 fixed thereto and which meshes with a gear 56 fixed on one end of a shaft 57. The shaft 57 is rotatably mounted in the gear housing 52 and the end of the shaft 57 remote from the gear 56 has a crank 60 fixed thereto (Figures 3, 4 and 5).

The housing 50 has an integrally formed extension thereon to support line measuring means in the form of a counter 62 fixed therein as by screws 63. The counter 62 may be one of any number of conventional types available wherein the number of revolutions imparted thereto, through a bevel gear 64, will be counted and recorded on number wheels mounted in the counter and positioned to be observed through a window 65 in the housing 50 (Figure 3). The counter 62 is provided with a reset wheel 66 mounted on the opposite end from the bevel gear 64 and a portion of which extends through an opening in the housing 50 to be accessible by an operator for resetting the number wheels in the counter to their zero position.

The bevel gear 64 is driven by engagement with a mating bevel gear 68 (Figure 8) fixed on a shaft 70 which is mounted for rotation in outwardly extending bearing members 72 integral with the counter housing 62 and an inner wall 73 of the housing 50. The shaft 70 has a bevel gear 75 fixed to the end thereof, adjacent the wall 73, and the gear 75 is driven by a mating bevel gear 76 (Figure 6). The bevel gear 76 is fixed on one end of a relatively short shaft 77 which is rotatably mounted in the wall of the housing 50 and the other end of the shaft 77 has a grooved pulley 80 fixed thereto.

Cartridges other than the cartridge C may be used in conjunction with the activator 20 and some other types which may be used are shown in Figures 11 through 15. In Figures 11 and 12, a modified form of cartridge C–1 is shown wherein the nose portion 32' is more pointed than the nose portion 32 of the cartridge C, shown in Figure 10, to facilitate easier turning of the cartridge C–1 in conduits having sharper radiuses or bends. The cartridge C–1 is provided with an annular detent 33' intermediate its ends and is grooved or serrated as at 82 longitudinally to reduce the frictional engagement of the cartridge C–1 with the inside surfaces of the conduit through which it passes. The cartridge C–1 is also provided with line attaching means in the form of an eye 83 fixed adjacent the rear end. This particular cartridge C–1 is adapted to carry or pull the line L therebehind from a suitable line supply source, such as the reel 51 in the activator 20 during its flight or movement through the conduit.

Another type of cartridge which may be used is indicated at C–2 in Figures 13 and 14 and in this type the nose portion 32" is sharper than the nose 32 of the cartridge C and the body portion thereof is elongated to accommodate a greater amount of compressed gas than the cartridges C and C–1 and would be used for carrying a line through long conduits. The rear elongated tail 34" on the cartridge C–2 has a supply of line L" wound thereon and may have a protective housing 35" surrounding the line L" to protect the line wound on the cartridge C–2 as it passes through the conduit and the line will be unwound from the housing 35" and trailed behind the cartridge during its flight through the conduit.

Another form of cartridge C–3 is shown in Figure 15 wherein the body portion thereof is shaped substantially the same as the cartridge C and the tail portion 34''' is provided with a flanged end 85 to support a supply of line L''' wound on the tail portion 34'''. In this form of cartridge, the line is adapted to be carried by the projectile or cartridge C–3 and unwound therefrom as the projectile is passed through a conduit.

In operation, the cartridge C may be utilized to lay the line L in the conduit 10 (Figure 1) by first attaching the end of the line L to the reel 51 (Figure 7) and placing the cartridge C in the barrel of the activator 20 so that the resilient plunger 27 (Figure 9) engages the side, and in this case the annular detent 33 on the cartridge C to resiliently hold and accurately position the cartridge C preparatory to firing or activating the cartridge C with the activator 20. The end of the line L may be attached to the reel 51 in any suitable manner such as by passing the end of the line through the flange of the reel 51 and knotting the same (Figures 2 and 7). The free end of the flexible hose 21 is then placed in one end of the conduit 10 (Figure 1) and the trigger 47 pulled to release the pin 40. The spring 42 will then move the pin 40 and collar 43 forwardly at a fast rate of speed so that the pointed end 44 will pierce the end of the cartridge C and the collar 43 will engage the end of the cartridge C to push the same forwardly so that the cartridge will be released by the detent 27. The cartridge C will then be propelled through the conduit 10 by the compressed gas escaping therefrom through the rear punctured end and the line L will be unwound from the cartridge C and trailed behind the cartridge C during its passage through the conduit 10.

After the cartridge C has emerged from the other end of the conduit 10 (Figure 1), the line L may be cut adjacent the exit end of the conduit and a stronger line or cable, not shown, attached thereto to be pulled through the conduit 10 by the line L as it is removed from the conduit 10 by rewinding the line L onto the reel 51. In order to accurately measure the distance the line L has traversed in passing through the conduit 10 and thereby determine the length of the conduit, the line L must be loped over the pulley 80, in the manner shown in Figures 4 and 5, so that as the line is wound onto the reel 51 the pulley 80 will be rotated by the line to actuate the counting device 62. As the line is wound onto the reel 51, the pulley 80 will be rotated by the moving line to drive the bevel gears 76, 75, 68 and 64 and rotate the number wheels of the counting device 62 to indicate the length of the conduit in the opening 65 in the housing 50 (Figure 3). When the line L has been withdrawn, the cable which was tied to it will be positioned in the conduit 10 and after removing the activator 20, an electrical conductor or wire, corresponding in length to the length of the line removed, may then be attached to the end of the cable and the cable pulled through the conduit to position the electrical conductor, not shown, in the conduit.

The above procedure may be used with either of the cartridges C, C-2 or C-3 since all three of these cartridges have a supply of line wound thereon and line which will be unwound as the cartridge is propelled through the conduit.

The procedural operation above described must be varied slightly when using a cartridge such as that illustrated at C-1 in Figures 11 and 12 and since the line is not wound on the cartridge, the line must be initially wound on the reel 51 and the free end thereof atttached to the eye 83 on the tail 34' of the cartridge C-1. The cartridge C-1 is then positioned in the activator 20 and activated in the same manner as the cartridge C so that when the cartridge is passed through the conduit the line will be pulled from the reel 51 to trail the cartridge C-1 through the conduit 10. The electrical conductor may then be inserted in the conduit by first pulling a cable through the conduit by removing the line and then pulling the electrical conductor through the conduit by removing the cable after attaching the electrical conductor to one end thereof.

In some cases, it may not be necessary to measure the electrical conductor to be used, and in such a case, it is merely neessary to pass the cartridge through the conduit and trail the line therebehind, attach the electrical conductor to the line and remove the line while inserting the electrical conductor. In this case the step of placing a cable in the conduit to measure the length of the conduit is omitted.

It is thus seen that there has been provided a method of inserting electrical conductors in conduits by utilization of a self-propelled projectile which is passed through the conduit. The method includes first inserting a relatively light line by the projectile, removing the light line while measuring the length of line removed and while inserting a second line attached to the first line and then removing the second line while inserting an electrical conductor connected to the second line, the electrical conductor being pre-cut to a length which corresponds to the length of the first line removed. An apparatus has also been provided which facilitates the positioning and activating of the self-propelled projectile, has means for rewinding the line from the conduit and measuring means for indicating the length of line removed.

In the drawings and specification there have been set forth several embodiments of the invention and, although specific terms are employed, they are used in a generic and descriptive sense only and not for purposes of limitation, the scope of the invention being defined in the claims.

We claim:

1. A method of inserting a flexible line in a conduit comprising the steps of attaching the line to a self-propelled projectile, positioning the projectile for passing through the conduit, activating the projectile to propel the projectile through the conduit while trailing the line attached thereto therebehind, and guiding the projectile through the conduit by the internal wall surface of the conduit to lay the line in the conduit.

2. A method of inserting an electrical conductor in a conduit comprising the steps of attaching a flexible line directly to a self-propelled projectile, positioning the projectile for passing through the conduit, activating the projectile to propel the projectile through the conduit while trailing the line attached thereto therebehind, guiding the projectile through the conduit by the internal wall surface of the conduit to position the line in the length of the conduit, attaching the electrical conductor to one end of the line positioned in the conduit, and removing the line from the conduit by pulling on the other end of the line while pulling the electrical conductor into the conduit.

3. A method of inserting a flexible line in a conduit comprising the steps of attaching the flexible line to a self-propelled projectile powered by a pressurized propellant, positioning the projectile adjacent one end of the conduit to enter the conduit, activating the projectile to propel the projectile into the conduit while trailing the line attached thereto therebehind, and guiding the projectile through the conduit by the internal wall surface of the conduit to position the line in the length of the conduit.

4. A method of inserting a flexible line in a conduit comprising the steps of attaching the line to an elongated unguided self-propelled projectile of greater length than the largest inside dimension of the conduit and of smaller cross-sectional dimensions than the smallest inside dimension of the conduit, positioning the projectile for passing through the conduit, activating the projectile to propel the projectile through the conduit while trailing the line therebehind, and guiding the projectile through the conduit by the internal wall surface of the conduit to position the line in the length of the conduit.

5. A method of inserting a flexible line in a conduit comprising the steps of attaching the line to an unguided self-propelled projectile of greater overall length than the largest inside dimension of the conduit, positioning the projectile adjacent one end of the conduit to enter the conduit, activating the projectile to propel the projectile into the conduit while trailing the line therebehind, and guiding the projectile through the conduit by the internal wall surface of the conduit to position the line in the length of the conduit.

6. A method according to claim 5 wherein an electrical conductor may be inserted in the conduit by attaching a flexible cable to the end of the line adjacent the other end of the conduit, removing the line from the conduit while pulling the attached flexible cable into the conduit and while measuring the length of flexible line removed, attaching one end of an electrical conductor to the end of the flexible cable adjacent said one end of the conduit, the length of the electrical conductor corresponding in length to the length of the flexible line removed, and removing the flexible cable while pulling the attached electrical conductor into the conduit.

7. An apparatus for inserting a line in a conduit comprising a normally dormant self-propelled projectile, a projectile activator adapted to receive said projectile, a flexible line having one end connected to said projectile and the other end being restrained from movement into the conduit, projectile guiding means associated with said activator to guide said projectile into said conduit, and projectile activating means in said activator to engage and activate said projectile.

8. An apparatus for inserting a flexible line in a conduit comprising a normally dormant self-propelled projectile, a projectile activator adapted to receive said projectile, opposite ends of said flexible line being connected to said projectile and said activator respectively, projectile guiding means integral with said activator to guide said projectile into said conduit, resilient means in said activator engageable with said projectile to resiliently hold said projectile in a predetermined position to said activator and projectile activating means in said activator to engage and activate said projectile.

9. An apparatus for inserting a flexible line in a conduit comprising a compressed gas filled cartridge, a cartridge activator adapted to receive said cartridge, a flexible line having one end connected to said cartridge and its other end restrained against movement into said conduit, cartridge guiding means engageable with said activator to guide said cartridge into said conduit, and cartridge piercing means in said activator for puncturing said cartridge to allow the compressed gas to escape and propel the cartridge out of said activator and through said conduit to trail the line therebehind.

10. An apparatus for inserting a flexible line in a conduit comprising a compressed gas filled cartridge, a cartridge activator adapted to receive said cartridge, a flexible line wound onto said cartridge and connected at opposite ends to said cartridge and said activator respectively, cartridge guiding means engageable with said activator to guide said cartridge into said conduit, cartridge piercing means in said activator for puncturing said cartridge to allow the compressed gas to escape and propel the cartridge out of said activator and through said conduit to trail the line therebehind, and line reel means on said activator to return said line from the conduit and to said activator.

11. An apparatus for inserting a flexible line in a conduit comprising a compressed gas filled cartridge, a cartridge activator adapted to receive said cartridge, a flexible line having one end connected to said cartridge and its other end restrained against movement into said conduit, and cartridge piercing means in said activator for puncturing said cartridge to allow the compressed gas to escape and propel the cartridge out of said activator and through said conduit to trail the line therebehind.

References Cited in the file of this patent

UNITED STATES PATENTS

| Number | Name | Date |
|---|---|---|
| 208,724 | Eggers et al. | Oct. 8, 1878 |
| 395,881 | Cunningham | Jan. 8, 1889 |
| 1,999,559 | Brendlin | Apr. 30, 1935 |
| 2,490,378 | Mount | Dec. 6, 1949 |
| 2,500,026 | Erickson | Mar. 7, 1950 |
| 2,504,525 | Holderness | Apr. 18, 1950 |
| 2,576,629 | Morby | Nov. 7, 1951 |
| 2,637,112 | La Fontaine | May 5, 1953 |
| 2,646,019 | Chetlan | July 21, 1953 |
| 2,729,424 | Eppensteiner | Jan. 3, 1956 |
| 2,805,622 | Cammin-Christy | Sept. 10, 1957 |
| 2,836,105 | Doak, et al. | May 27, 1958 |

FOREIGN PATENTS

| Number | Country | Date |
|---|---|---|
| 46,813 | Australia | Mar. 10, 1911 |
| 1,020,589 | France | Nov. 19, 1952 |
| 466,047 | Italy | Oct. 13, 1951 |

OTHER REFERENCES

"Signal Communications: Wire," Booklet CN XIX3, published December 1952 by the U.S. Army Corps of Engineers, Fort Belvoir, Va. (Page 2 relied on. Copy in Div. 61.)

"Popular Science Monthly," July 1945 (page 152 relied on). Copy in Scientific Library and in Div. 62.

"U.S. Rocket Ordnance," published by Joint Board on Scientific Information Policy, Washington 1946. (Pages 49 and 50 relied on. Copy in Div. 10.)